(12) United States Patent
Nishio et al.

(10) Patent No.: US 10,072,195 B2
(45) Date of Patent: Sep. 11, 2018

(54) THERMALLY CONDUCTIVE COMPLEX OXIDE, PRODUCTION METHOD THEREFOR, THERMALLY CONDUCTIVE COMPLEX OXIDE-CONTAINING COMPOSITION, AND USE THEREFOR

(71) Applicant: DAINICHISEIKA COLOR & CHEMICALS MFG. CO., LTD., Tokyo (JP)

(72) Inventors: Akira Nishio, Tokyo (JP); Toru Kawakami, Tokyo (JP); Kenichi Yamane, Tokyo (JP); Naotsugu Yamamura, Tokyo (JP); Shingo Tominaga, Tokyo (JP)

(73) Assignee: DAINICHISEIKA COLOR & CHEMICALS MFG. CO., LTD., Tokyo (JP)

(*) Notice: Subject to any disclaimer, the term of this patent is extended or adjusted under 35 U.S.C. 154(b) by 0 days.

(21) Appl. No.: 15/122,321

(22) PCT Filed: Mar. 12, 2015

(86) PCT No.: PCT/JP2015/057385
§ 371 (c)(1),
(2) Date: Aug. 29, 2016

(87) PCT Pub. No.: WO2015/137468
PCT Pub. Date: Sep. 17, 2015

(65) Prior Publication Data
US 2016/0369148 A1 Dec. 22, 2016

(30) Foreign Application Priority Data
Mar. 14, 2014 (JP) .................. 2014-052618

(51) Int. Cl.
| | |
|---|---|
| *C09K 5/00* | (2006.01) |
| *C09K 5/14* | (2006.01) |
| *C01G 9/00* | (2006.01) |
| *C09C 1/40* | (2006.01) |
| *C01F 7/16* | (2006.01) |
| *C09D 1/00* | (2006.01) |
| *C09D 7/61* | (2018.01) |

(52) U.S. Cl.
CPC .............. *C09K 5/14* (2013.01); *C01F 7/162* (2013.01); *C01F 7/164* (2013.01); *C01F 7/166* (2013.01); *C01G 9/00* (2013.01); *C01G 9/006* (2013.01); *C09C 1/40* (2013.01); *C09D 1/00* (2013.01); *C09D 7/61* (2018.01); *C01P 2002/32* (2013.01); *C01P 2004/10* (2013.01); *C01P 2004/20* (2013.01); *C01P 2004/54* (2013.01); *C01P 2004/61* (2013.01); *C01P 2004/62* (2013.01); *C01P 2006/32* (2013.01); *C01P 2006/40* (2013.01)

(58) Field of Classification Search
CPC .............................. C09K 5/14; C08K 3/0075; C08K 2003/0812; C08K 2003/2227
USPC .......................................................... 252/74
See application file for complete search history.

(56) References Cited

U.S. PATENT DOCUMENTS

| | | | | | |
|---|---|---|---|---|---|
| 4,339,511 | A | * | 7/1982 | Morgan | C01F 7/028 264/621 |
| 4,471,070 | A | * | 9/1984 | Siefert | C01F 7/16 423/600 |
| 4,474,745 | A | * | 10/1984 | Ritter, II | C01F 7/162 423/600 |
| 5,108,979 | A | * | 4/1992 | Magnabosco | B01J 21/005 423/263 |
| 5,466,280 | A | * | 11/1995 | Lee | C04B 28/26 106/14.12 |
| 5,478,786 | A | * | 12/1995 | Shaw | C04B 35/043 106/690 |

(Continued)

FOREIGN PATENT DOCUMENTS

| | | |
|---|---|---|
| CN | 101448899 | 6/2009 |
| CN | 101671046 | 3/2010 |
| CN | 101704062 | 5/2010 |

(Continued)

OTHER PUBLICATIONS

Machine Translation of JP 63307107 A to Irisawa et al. dated Dec. 14, 1988 (Year: 1988).*

(Continued)

*Primary Examiner* — Jane L Stanley
(74) *Attorney, Agent, or Firm* — Hamre, Schumann, Mueller & Larson, P.C.

(57) ABSTRACT

The thermally conductive composite oxide of the present invention has excellent physical properties, such as high thermal conductivity, water resistance, acid resistance, electric resistance, and electric insulation, required for coating films, films, and articles thereof. Paints or resins including the composite oxide can provide coating films, films, and articles having such properties without treating of a surface, etc. The composite oxide has a spinel structure and contains aluminum as a main metal component and at least one metal other than aluminum, which is magnesium, zinc, calcium, and/or strontium, and has a ratio (b mol)/(a mol) in a range of 0.1 or more and 1.0 or less, where the ratio (b mol)/(a mol) is a number of moles (b) of the metal other than aluminum to that of moles (a) of an aluminum element derived from an alumina-based compound. The thermally conductive composite oxide has Mohs hardness of less than 9.

9 Claims, No Drawings

(56) References Cited

U.S. PATENT DOCUMENTS

| | | | | |
|---|---|---|---|---|
| 5,770,145 A | * | 6/1998 | Gerk | B24D 3/14 264/621 |
| 2006/0280963 A1 | | 12/2006 | Hazel et al. | |

FOREIGN PATENT DOCUMENTS

| | | |
|---|---|---|
| DE | 10257001 | 6/2004 |
| DE | 102011080639 | 10/2012 |
| JP | 63307107 | 12/1988 |
| JP | 6445716 | 2/1989 |
| JP | 0761814 | 3/1995 |
| JP | 07-126061 | 5/1995 |
| JP | 2004027177 | 1/2004 |
| JP | 3850371 | 11/2006 |
| JP | 2007070608 | 3/2007 |
| JP | 2012-036240 | 2/2012 |
| JP | 2013209278 | 10/2013 |
| JP | 2014009140 | 1/2014 |
| KR | 10-0568429 | 4/2006 |
| WO | 2012/018684 | 2/2012 |
| WO | 2012173108 | 12/2012 |
| WO | 2013039103 | 3/2013 |

OTHER PUBLICATIONS

Extended European Search Report, issued in the corresponding European Patent application No. 15760905.8, dated Aug. 21, 2017, 8 pages.

International Search Report, issued in the corresponding International Application No. PCT/JP2015/057385, dated May 26, 2015, 5 pages.

Chinese Office Action, issued in the corresponding Chinese Patent Application 201580013999.6, dated Mar. 16, 2017, 18 pages.

Walker et al., "Handbook of Metal Etchants", CRC Press, 1991, 4 pages.

Notice of Opposition, issued in the corresponding Japanese U.S. Pat. No. 6,152,220, dated Jan. Jan. 19, 2018, 22 pages.

European Office Action, issued in the corresponding European application No. 15 760 905.8, dated Jun. 21, 2018, 5 pages.

* cited by examiner

THERMALLY CONDUCTIVE COMPLEX OXIDE, PRODUCTION METHOD THEREFOR, THERMALLY CONDUCTIVE COMPLEX OXIDE-CONTAINING COMPOSITION, AND USE THEREFOR

TECHNICAL FIELD

The present invention relates to an alumina-based thermally conductive composite oxide, a process for producing the alumina-based thermally conductive composite oxide, a thermally conductive composite oxide-containing composition, and use thereof. In more detail, the present invention relates to a technology of a thermally conductive composite oxide that is excellent in water resistance, acid resistance, and electric insulation and that is useful as a material in consideration of molding processability after being blended into a synthetic resin or the like, and also relates to an article obtained by use thereof.

BACKGROUND ART

Currently, heat generation density of silica elements keeps on increasing in electronics fields. Moreover, a material having much higher heat dissipation and electric insulation than conventional ones are indispensable in the development of a SiC or GaN element that is expected as a power semiconductor. As a material that satisfies such requirements, there exists a composite material in which a filler having a high thermal conductivity is kneaded into a resin. As the filler for use in such application, magnesium oxide having a higher thermal conductivity than silica and having a lower hardness than alumina has been studied. Magnesium oxide has characteristics of having a high melting point and a high thermal conductivity and being nontoxic and therefore has widely been used as a heat resistant material, filler, or other materials. In recent years, tries to improve the performance of magnesium oxide have also been made by subjecting the surface of magnesium oxide to various kinds of surface treatment. However, according to studies conducted by the present inventors, magnesium oxide has a higher moisture-absorbing property than silica or alumina, and therefore cracks occur due to the volume expansion of the filler attributable to hydration with absorbed water in the use of magnesium oxide as a filler for resin compositions to cause a problem such as lowering of the thermal conductivity. Furthermore, there has also been a problem in imparting a long term stability to semiconductors.

As another thermally conductive material for filler application, a carbon nanotube, boron nitride, aluminum nitride, zinc oxide, or aluminum oxide (alumina) has generally been used. However, these materials have problems as described below. For example, wear in production apparatuses becomes a problem by the use of aluminum oxide because of a high hardness of aluminum oxide. To the contrary, the use of boron nitride having a low hardness causes an effect on the strength required for the materials. With respect to other materials, there is a drawback that the water resistance is poor in aluminum nitride, magnesium oxide, and zinc oxide, and there is a drawback that the electric insulation is poor in carbon nanotubes or other materials.

On the other hand, Patent Literature 1 discloses a magnesium oxide filler for blending into a resin, which gives molded articles excellent in molding processability, thermal conductivity, and water resistance. Moreover, Patent Literature 2 discloses coated magnesium oxide having, on the surface of magnesium oxide, a coating layer containing a composite oxide of magnesium and silicon and/or aluminum. Patent Literature 3 discloses an inorganic filler composite constituted by boehmite or zinc oxide having a granular, horn-like, fibrous, or plate-like shape, the boehmite or zinc oxide bonded or adhered to the surface of a thermally conductive filler such as boron nitride, aluminum nitride, magnesium oxide, a glass bead, or alumina.

CITATION LIST

Patent Literature

Patent Literature 1: Japanese Patent Laid-Open No. 2007-70608
Patent Literature 2: Japanese Patent No. 3850371
Patent Literature 3: International Publication No. WO 2013039103

SUMMARY OF INVENTION

Technical Problem

However, according to studies conducted by the present inventors, there have been problems described below in the conventional technologies. The magnesium oxide filler disclosed in Patent Literature 1 is a magnesium oxide filler in which molding processability, thermal conductivity, and water resistance are improved, however total physical properties including hardness are still insufficient. The filler made of the magnesium powder disclosed in Patent Literature 2 is subjected to surface treatment in order to improve moisture resistance (weather resistance) and thermal conductivity, however the metal species forming the surface is a complex oxide of magnesium and silicon, or magnesium and aluminum and therefore there exist the following problems. That is to say, the use of silicon is effective in terms of improvement in water resistance, but is insufficient in terms of acid resistance. Furthermore, the improvement measure using an aluminum salt in Patent Literature 2 is only effective in surface modification of magnesium oxide by wet process using aluminum nitrate or the like. Accordingly, the measure does not improve water resistance and acid resistance of magnesium oxide per se to be a base material, and therefore is not sufficient as an improvement measure. Moreover, a sufficient thermal conductivity is not obtained with the improvement measure. There is a problem that addition of a filler in a large amount in order to compensate for the drawback of insufficient thermal conductivity deteriorates the molding processability. The technology disclosed in Patent Literature 3 as a measure for solving the problem is a method intending to utilize characteristics of various fillers, but is insufficient for improving the water resistance and the thermal conductivity.

As a result of conducting diligent studies in order to solve the problems of the conventional technologies, the present inventors have recognized, as described below, that the hardness as one of the material characteristics is also extremely important in using the materials. Specifically, it becomes a problem that a high-hardness material such as, for example, alumina causes wear in a kneader, a molding machine, and a metal mold. To the contrary, with respect to a low-hardness material such magnesium oxide, an influence on the strength of molded bodies becomes a problem. Thus, in order to improve these problems simultaneously, the present inventors have taken notice of and have developed a composite oxide having a spinel structure, the composite oxide having a lower hardness than alumina and having a higher hardness than magnesium oxide.

Accordingly, an object of the present invention is to provide a novel composite oxide having a high thermal conductivity, having a lower hardness than alumina, having a higher hardness than magnesium oxide, not causing various problems seen for conventional materials, and therefore being extremely useful in practical use.

Solution to Problem

The problems of the conventional technologies are solved by the present invention as follows. That is to say, the present invention provides a thermally conductive composite oxide as described below.

[1] A thermally conductive composite oxide being a composite oxide having a spinel structure, obtained by firing at least an alumina-based compound and a compound of a metal other than aluminum, and containing: aluminum as a main component metal; and at least one metal other than aluminum, in which the metal other than aluminum is at least one selected from the group consisting of magnesium, zinc, calcium and strontium, a ratio, (b mol)/(a mol), of a number of moles (b) of the metal other than aluminum to a number of moles (a) of an aluminum element in the alumina-based compound is 0.1 or more and 1.0 or less, and a Mohs hardness of the thermally conductive composite oxide is less than 9.

[2] The thermally conductive composite oxide according to [1], in which a content ratio of each metal to a total amount of all the metals is 50 to 90 mol % for aluminum derived from the alumina-based compound and is 10 to 50 mol % for the metal other than aluminum.

[3] The thermally conductive composite oxide according to [1] or [2], in which the alumina-based compound is alumina, aluminum hydroxide, or an alumina hydrate.

[4] The thermally conductive composite oxide according to any one of [1] to [3], in which the compound of the metal other than aluminum is at least one selected from the group consisting of an oxide, a hydroxide, a sulfate, a nitrate, a chloride, a carbonate, a basic carbonate, an oxalate, and an acetate of the metal other than aluminum.

[5] The thermally conductive composite oxide according to any one of [1] to [4], having a flake-like or needle-like shape having an average major axis diameter of 5 to 40 μm and an average minor axis diameter of 0.1 to 30 μm, or having a powdered form.

Furthermore, the present invention provides a process for producing a thermally conductive composite oxide as describe below.

[6] A process for producing the thermally conductive composite oxide according to any one of [1] to [5], the process including:
adding an alkali agent and an aqueous solution of the compound of the metal other than aluminum to an aqueous suspension solution of the alumina-based compound to deposit a precipitate on a surface of the alumina-based compound, thereby producing a precursor; and
firing the produced precursor and thereafter subjecting the fired product to pulverization treatment.

[7] The process for producing the thermally conductive composite oxide according to [6], wherein the alumina-based compound has a granular, flake-like, or needle-like shape.

Moreover, according to the present invention, a thermally conductive composite oxide-containing composition and an article as described below are provided.

[8] A thermally conductive composite oxide-containing composition, containing: the thermally conductive composite oxide according to any one of [1] to [5]; and a thermally conductive filler.

[9] An article using the thermally conductive composite oxide according to any one of [1] to [5] or the thermally conductive composite oxide-containing composition according to [8] for a combination constituting a coating liquid or a resin composition.

Advantageous Effects of Invention

Required physical properties can be obtained without the need for an improvement measure such as surface treatment as an essential measure by single use of the thermally conductive composite oxide according to the present invention. More specifically, according to the present invention, a thermally conductive composition: which is excellent in thermal conductivity, water resistance, acid resistance, and electric insulation; and with which the problems of the molding processability in coating films, films, and molded bodies obtained by blending the thermally conductive composition into paints and resin compositions are solved, can be provided. To take an example for specific description, the resolution of the problems of the conventional technologies is achieved by use of a composite oxide having a spinel structure, the composite oxide having favorable water resistance and acid resistance and having a lower Mohs hardness than aluminum oxide, in order to compensate for the drawback of magnesium oxide that is inferior in water resistance and acid resistance and the drawback of aluminum oxide having a high Mohs hardness, as high as 9. Further, as a measure for making physical properties more satisfactory, it is particularly effective to use an alumina-based compound having a flake-like or needle-like shape as a raw material and fire the alumina-based compound, and thereby a thermally conductive composite oxide having a flake-like or needle-like shape can be obtained at a high purity. Furthermore, a more useful article having an effective thermal conductivity can be provided by using the thermally conductive composite oxide according to the present invention.

DESCRIPTION OF EMBODIMENTS

Hereinafter, the thermally conductive composite oxide according to the present invention will be described in detail giving preferred embodiments.

The thermally conductive composite oxide according to the present invention is a thermally conductive composite oxide having a spinel structure, obtained by firing at least an alumina-based compound and a compound of a metal other than aluminum, and containing: aluminum as a main component metal; and at least one metal other than aluminum. And the thermally conductive composite oxide contains, as the metal other than aluminum being a main component metal, at least one selected from the group consisting of magnesium, zinc, calcium and strontium, and in the thermally conductive composite oxide, the Mohs hardness (hereinafter, simply referred to as hardness) is controlled so as to be less than 9. Hereinafter, respective components that constitute the present invention will be described.

(Alumina-Based Compound)

Alumina ($Al_2O_3$) is one of the alumina-based compounds that are preferably used as the alumina-based compound for use in a raw material of the thermally conductive composite oxide according to the present invention. Alumina is excellent in heat resistance and chemical stability and is synthesized through heat decomposition of an aluminum salt, aluminum hydroxide, or an aluminum alkoxide, or through oxidation of metal aluminum. Different kinds of intermediate alumina each having a different crystal composition (such as α, γ, η, θ, and χ) are obtained depending on the differences of starting raw materials and of firing temperatures, however α-alumina is finally obtained. The industrial process for producing α-alumina is a process in which an alumina component is extracted from bauxite as a raw material with a solution of an alkali such as sodium hydroxide and is converted to aluminum hydroxide being an aluminum hydrate, and further, the aluminum hydroxide is fired. The process of extracting aluminum hydroxide from bauxite with a sodium hydroxide solution is called as a Bayer process, and aluminum hydroxide produced by the process is normally gibbsite ($Al_2O_3 \cdot 3H_2O$) being a trihydrate. As is well known in general, aluminum hydroxide such as gibbsite, bayerite, and boehmite [a hydrate of an inorganic compound containing at least 90% or more of aluminum hydroxide oxide represented by the general formula AlO (OH)] other than diaspore, and amorphous alumina hydrates such as alumina gel are dehydrated by firing and finally become the most stable α-alumina via various kinds of intermediate alumina such as η-alumina, χ-alumina, γ-alumina, κ-alumina, and θ-alumina. It is also well known that these transitions include the transition series specific to the starting materials and the firing conditions or atmospheres.

The present inventors have confirmed that, by using: stable α-alumina; γ-alumina or θ-alumina being transition alumina; or further boehmite as an alumina-compound for use in a raw material for a thermally conductive composite oxide, the reaction can easily be controlled and the thermally conductive composite oxide according to the present invention can be made as intended. Furthermore, it has been able to be confirmed that the alumina-based compound to be used determines physical properties such as strength and thermal conductivity of the composite oxide finally obtained. Accordingly, it is preferable that the particle diameter of the alumina-based compound to be used is 0.1 to 100 μm, and it is more preferable that the aspect ratio (average diameter of major axes/average diameter of minor axes) is 1 to 500. The shape of the alumina-based compound is not particularly limited, and spherical or amorphous alumina-based compounds can be used. Most preferably, the alumina-based compound having a flake-like, plate-like, or needle-like shape being an anisotropic shape may be used. It is effective to use such a material having an anisotropic shape in that the mechanical strength and thermal conductivity of the composite oxide obtained are made to be favorable. Through the production process using the alumina-based compound having anisotropy as a raw material, the thermally conductive composite oxide having an average major axis diameter of 5 to 40 μm and an average minor axis diameter of 0.1 to 30 having a flake-like or needle-like shape having a thickness of 0.1 to 1 μm can easily be obtained at a high purity. Considering the thermal conductivity and the dispersibility, when both of the average major axis diameter and the average minor axis diameter are less than the lower limit of the above-described range, there is apprehension that the thermal conductivity is lowered, and on the other hand, when both of the average major axis diameter and the average minor axis diameter are larger than the upper limit of the above-described range, there is a tendency that the dispersion is difficult.

(Compound of Metal Other than Aluminum)

In the present invention, the metal species that is other than aluminum and that is fired in combination of the above-described alumina-based compound has been determined to be at least one selected from the group consisting of magnesium, zinc, calcium, and strontium in consideration of safety and also physical properties of each metal species as a simple substance. The composite oxide having a spinel structure is constituted by the compound of such a metal contained together with the alumina-based compound in a raw material to be fired. Each of these metals, when mixed in the raw material, exists as a compound such as an oxide, a hydroxide, or a carbonate on the surface of the alumina-based compound, and the composite oxide according to the present invention is obtained by firing the compound together with the alumina-based compound. The kind of salt for use in the raw material to be fired can be selected according to the synthesis method, but is preferably at least one selected from the group consisting of sulfates, nitrates, chlorides, carbonates, basic carbonates, oxalates, and acetates. In preparing the thermally conductive composite oxide according to the present invention, it is required that the compound of the metal other than aluminum for use as a raw material be constituted so that the ratio, (b mol)/(a mol), of the number of moles (b) of the metal that constitutes the compound of the metal other than aluminum to the number of moles (a) of the aluminum element in the alumina-based compound may be 0.1 or more and 1.0 or less.

(Ratio of Aluminum Used and Metal Other than Aluminum Used)

When the content ratio of each metal to the total amount of all the metals that constitute the thermally conductive composite oxide according to the present invention is in a range of 50 to 90 mol % for aluminum derived from the alumina-based compound and is in a range of 10 to 50 mol % for the metal other than aluminum, the thermally conductive composite oxide can suitably be prepared. More preferably, the content ratio of each metal to the total amount of all the metals that constitute the thermally conductive composite oxide according to the present invention is 60 to 80 mol % for aluminum derived from the alumina-based compound and is 20 to 40 mol % for the metal other than aluminum. It is not preferable that the content ratio of aluminum exceeds 90 mol % because, for example, the characteristics of aluminum become dominant to cause a problem of wear in a production apparatus in some cases. On the other hand, it is not preferable that the content ratio of aluminum falls below 50 mol % because, for example, the metal component other than aluminum forms an oxide to give an adverse effect on physical properties such as water resistance, acid resistance, and electric insulation.

As described above, it is more preferable that the content ratio of each metal is in the above-described range because the thermally conductive composite oxide that is excellent in water resistance, acid resistance, and electric insulation and further, that is also excellent in molding processability after being blended into a synthetic resin or the like while the strength is maintained can stably be produced. Particularly, the composite oxide according to the present invention in which the content ratio of each metal is in the above-described range has a favorable thermal conductivity when compared with magnesium oxide, zinc oxide, and aluminum oxide, and is excellent in water resistance and acid resistance when compared with aluminum nitride, magnesium oxide, and zinc oxide.

(Surface Modification of Thermally Conductive Composite Oxide)

An embodiment in which the surface of the thermally conductive composite oxide according to the present invention is modified by subjecting the thermally conductive composite oxide to surface treatment is also preferable, and by subjecting the thermally conductive composite oxide to surface treatment, the functionality is more enhanced. Specifically, the composite oxide, for example, whose hydrophilicity to a resin is enhanced by subjecting the composite oxide to surface treatment can make the thermal conductivity of the resin more favorable by an effect of enhancing the dispersibility of the composite oxide when added to the resin.

Examples of the compound for use in surface treatment include fatty acids, fatty acid esters, metal salts of a fatty acid, phosphate esters, metal salts of a phosphate ester, silane coupling agents, surface active agents, polymer flocculants, titanates, and silicones, and one or more of these can be selected. It is preferable to conduct surface treatment using the compound or compounds preferably in a ratio of 0.01 to 20% by mass to 100% by mass of the composite oxide.

The surface treatment method is not particularly limited, and, for example, surface treatment can be conducted in such a way that an aqueous solution obtained by dissolving sodium stearate in water having a temperature of 90° C. or higher is dropped into a suspension liquid obtained by peptizing the composite oxide with a homomixer, thereby depositing stearic acid on the surface of the composite oxide.

(Process for Producing Thermally Conductive Composite Oxide)

Next, the process for producing the thermally conductive composite oxide according to the present invention is described. There are a wet process and a dry process for producing the thermally conductive composite oxide according to the present invention, and the thermally conductive composite oxide having sufficient physical properties can be obtained from both of the processes. However, it is required that the composite oxide be made so as to have, for example, a flake-like or needle-like shape as a measure for seeking higher effects coming from physical properties thereof, and in consideration of such an aspect, the thermally conductive composite oxide having such a shape is obtained at a high purity by employing the wet process. Therefore, in the process for producing the thermally conductive composite oxide according to the present invention is determined to employ the wet process through which the thermally conductive composite oxides having a more preferable shape are obtained. Specifically, according to the wet process in which the alumina-based compound having a flake-like or needle-like shape is used as a raw material, a uniform and more useful composite oxide having a flake-like or needle-like shape being a more favorable embodiment and having an average major axis diameter of 5 to 40 μm and an average minor axis diameter of 0.1 to 30 μm can be obtained at a high purity. That is to say, the thermally conductive composite oxide of such an embodiment as described above exhibits a moderate hardness and a high thermal conductivity and therefore is more suitable.

The process for producing the thermally conductive composite oxide according to the present invention utilizing the wet process includes: adding an alkali agent and an aqueous solution of the compound of the metal other than aluminum to an aqueous suspension solution of the alumina-based compound to deposit a precipitate on the surface of the alumina-based compound, thereby producing a precursor; and firing the produced precursor and thereafter subjecting the fired product to pulverization treatment. More specifically, in the process for producing the thermally conductive composite oxide according to the present invention, first of all, as a raw material containing a main component metal, the alumina-based compound and the compound of a metal selected from magnesium, zinc, calcium, and strontium, for example, a sulfate, a nitrate, a chloride, a carbonate, a basic carbonate, an oxalate, or an acetate of one of respective metals are used, the alumina-based compound is suspended in water, and the aqueous solution containing the compound of the metal selected from above-described metals is dropped into the aqueous suspension solution of the alumina-based compound simultaneously with the alkali agent to deposit a precipitate or a co-precipitate on the surface of the alumina-based compound and produce a precursor. Subsequently, the precursor obtained by filtration and drying is fired and thereafter is subjected to pulverization treatment, thereby obtaining a powder having a spinel structure (spinel powder). In the usage of the spinel powder obtained, the spinel powder is kneaded into a paint or a resin to thereby achieve imparting a high thermal conductivity to the paint or the resin.

As the alumina-based compound for use in producing the thermally conductive composite oxide, boehmite or the like as previously listed can be used. Boehmite is a hydrate of a water-containing inorganic compound represented by AlO(OH), however a compound of a large water content type known as pseudo-boehmite can also be used. Moreover, even when γ-alumina or θ-alumina known as transition alumina, or stable α-alumina is used as a source of aluminum, a spinel powder that is almost the same as the spinel powder obtained using boehmite can be obtained.

An important point in the production process according to the present invention is to form the precipitate of the metal other than aluminum as a precursor on the surface of the alumina-based compound, and in order to achieve this, any of synthesize methods that are generally utilized, in addition to the above-described precipitation method (co-precipitation method), such as a homogeneous precipitation method in which a substance as a source of an alkali is decomposed in a liquid to produce an alkali, thereby forming a precipitate, and a gas method in which a carbon dioxide gas is blown into a suspension liquid of a hydroxide to form a precipitate of a carbonate, is applicable to the production process according to the present invention.

As described previously, the composite oxide according to the present invention can be produced not only by the wet process but also by the dry process as described below. Specifically, alumina, boehmite, or transition alumina as the alumina-based compound to be a raw material, and an oxide, a hydroxide, or a carbonate being a compound containing one, or two or more of metals selected from group consisting of magnesium, zinc, calcium, and strontium as a source of the metal other than aluminum are used, the predetermined amount thereof are mixed with a mixer, the resultant mixture is fired at a temperature of 600° C. or higher, thereafter the fired product is subjected to pulverization treatment, and thus a spinel powder can be obtained. However, attention should be paid in determining mixing conditions because there is a risk that the shape of the alumina-based compound is broken during mixing with a mixer. Moreover, mixing is generally conducted in the air but can also be conducted using a solvent such as water or an alcohol. The spinel powder thus obtained has a favorable thermal conductivity even when compared with magnesium oxide, zinc oxide, and aluminum oxide, and is excellent in water resistance and acid resistance even when compared with aluminum nitride, magnesium oxide, and zinc oxide. When the comparison is made between the wet process and the dry process, the dry process is an easy and simple process that is suitable for synthesizing the spinel powder in a large amount, and on the other hand, the wet process is a process that is suitable for synthesizing a high-quality spinel powder excellent in homogeneity.

Examples of the particularly useful wet process as the process for producing the thermally conductive composite oxide according to the present invention include a process including: a step (1) of adding simultaneously an alkali agent and an aqueous solution (in the case where two or more of metal salts are contained, mixed solution thereof) containing a main component metal other than aluminum to a suspension liquid of the alumina-based compound to deposit a precipitate, thereby producing a precursor; and a step (2) of firing the produced precursor at a temperature of, for example, 600 to 1500° C. and thereafter subjecting the fired product to pulverization treatment. Hereinafter, the wet process for producing the composite oxide according to the present invention will be described in detail.

In the step (1), the suspension liquid of the alumina-based compound and the aqueous solution containing the compound of the main component metal other than aluminum are prepared. As the compound of the metal, salts, chlorides, or the like that are generally used for industrial applications, such as sulfates, nitrates, chlorides, carbonates, oxalates, and acetates, can be used. Hereinafter, the compound of the metal is described taking a metal salt as an example. It is appropriate to make the concentration of the metal salt in the aqueous solution about 0.1 to about 10 mol/L. The aqueous solution of the metal salt is dropped simultaneously with, for example, an aqueous solution of an alkali such as sodium carbonate being a precipitant into a precipitation medium prepared in advance. The concentration during reaction in terms of the metal salt may be within a range that does not give an adverse effect on the precipitation product (co-precipitate) in particular, but is preferably 0.05 to 1.0 mol/L in consideration of the operability and the subsequent step. It is not preferable that the concentration is less than 0.05 mol/L because the yield becomes lowered. On the other hand, when the concentration exceeds 1.0 mol/L, the synthesized product becomes inhomogeneous in some cases. The temperature (synthesis temperature) at which the co-precipitate is deposited may be set at a normal temperature in the wet process. Specifically, it is preferable to deposit (synthesize) the co-precipitate at 0 to 100° C.

As described above, when the aqueous solution of the metal salt and the aqueous solution of the alkali agent as the precipitant are simultaneously added to the suspension liquid of the alumina-based compound to deposit the co-precipitate, it is preferable to set the pH in a range of 5 to 12. It is not preferable that the pH when the co-precipitate is deposited exceeds 12 because there is a risk that the surface of the alumina-based compound is dissolved and therefore there is a risk that the composition of the co-precipitate becomes different from the intended composition. Also, it is not preferable that the pH when the precipitate (co-precipitate) is deposited is less than 5 because there is a risk that the metal component does not form the precipitate from the same reason as described above.

In the step (2), the deposited precursor is washed with water and dried. Water-soluble salts by-produced during synthesis can be removed through washing with water. It is preferable to conduct washing with water until the electric conductivity of the filtrate falls into 1000 µS/cm or less, more preferably 500 µS/cm or less. It is not preferable that the electric conductivity exceeds the above-described range because the inhomogeneity occurs to the fired product in some cases and moreover there is also a risk that the residual salt is decomposed to produce a toxic gas during firing.

Further, in the step (2), the precursor washed with water and dried is fired at a temperature of, for example, 600 to 1500° C., more preferably 1000 to 1500° C. Firing the precursor can make the precursor crystalized. It is not preferable that the firing temperature is lower than the above-described temperature range because the spinel structure is hard to form. On the other hand, it is not preferable from the economic standpoint to raise the firing temperature exceeding the above-described temperature range because there is not a large change in the product resulting in wasteful consumption of energy. It is preferable to conduct washing with water after firing in order to remove water-soluble salts by-produced through firing. It is preferable to conduct washing with water until the electric conductivity of the filtrate falls into 500 µS/cm or less. Thereafter, it is preferable to dry the fired product at a temperature of about 120° C. for about 12 hours, and thereby the thermally conductive composite oxide according to the present invention can stably be obtained. It can be confirmed that the composite oxide according to the present invention obtained in a manner as described above, when analyzed, for example, by powder X-ray diffraction, is a single compound having a spinel structure and not having a heterogeneous phase.

(Use of Thermally Conductive Composite Oxide)

Among various kinds of preferable utilization of the thermally conductive composite oxide according to the present invention, addition to various plastics such as thermoplastic resins and thermosetting resins for the purpose of imparting thermal conductivity is effective. Particularly in the case where the thermally conductive composite oxide according to the present invention is added to thermoplastic resins, the degree of freedom in terms of molding processability by injection molding or the like is higher than in the case where a conventional composite oxide pigment is used, and therefore the addition to thermoplastic resins is preferable for this reason. Examples of the thermoplastic resin include polyethylene resins, polypropylene resins, ethylene-propylene copolymers, ethylene-vinyl acetate copolymers, acrylonitrile-ethylene-styrene copolymers, acrylonitrile-butadiene-styrene copolymers, acrylonitrile-styrene copolymers, polyvinyl chloride resins, polystyrene resins, polyacrylonitrile resins, polyamide resins, thermoplastic polyimide resins, thermoplastic urethane resins, polyamino-bismaleimide resins, polyamide-imide resins, polyetherimide resins, polymethyl methacrylate resins, polyvinyl acetate resins, polycarbonate resins, polyacetal resins, polyethylene terephthalate resins, polyphenylene oxide resins, polyphenylene sulfide resins, polysulfone resins, polyether sulfone resins, polyether ether ketone resins, polyallylsulfone resins, bismaleimide triazine resins, polymethylpentene resins, fluorinated resins, liquid crystal polymers, olefin-vinyl alcohol copolymers, ionomer resins, and polyarylate resins and at least one of these thermoplastic resins can be selected and used according to the purpose.

<Filler>

As described previously, thermally conductive composite oxides having a flake-like or needle-like shape can easily be obtained by the process for producing the thermally conductive composite oxide according to the present invention, and these thermally conductive composite oxides are useful as a filler. The filler herein is added to resins, rubber, paints, or the like and is used for the purpose of enhancing strength, functionalities, or other purposes. In general, the problem of use of a thermally conductive filler is that melt-fluidity and mechanical strength are simultaneously lowered as the amount of the thermally conductive filler blended increases. For example, there are problems as follows: use of a carbon-based filler deteriorates electric insulation that is a characteristic of a resin per se because the carbon-based filler has electric conductivity; and use of a ceramic-based filler deteriorates thermal conductivity although electric insulation is exhibited. As the thermally conductive filler, metal-based fillers, inorganic compounds, and carbon-based fillers are used, and examples of the thermally conductive filler include metal-based fillers such as silver-, copper-, aluminum-, and iron-based fillers, inorganic-based fillers such as alumina, magnesia, silica, boron nitride, aluminum nitride, silicon carbide, boron carbide, and titanium carbide, and carbon-based fillers such as diamond, black lead, and graphite. It is considered that use of alumina, magnesium oxide, zinc oxide, silica, boron nitride, aluminum nitride, diamond, or the like among these thermally conductive fillers is preferable in electronic devices and so on where electric insulation is required. However, addition of these thermally conductive fillers has many problems to be solved in terms of water resistance, acid resistance, hardness, and electric insulation.

On the other hand, the thermally conductive composite oxide according to the present invention has properties in which weak points of various kinds of fillers described above are improved and therefore can effectively be used as an improved filler. Furthermore, use of the thermally conductive composite oxide according to the present invention together with the above-described filler in order to compensate for the weak points of the existing thermally conductive fillers, namely use of the thermally conductive composite oxide according to the present invention and the above-described filler in combination is also preferable usage in which the balance between the two can be adjusted according to the intended properties. The thermally conductive composite oxide-containing composition according to the present invention contains the thermally conductive filler as described above in addition to the thermally conductive composite oxide according to the present invention.

<Coating Liquid>

The thermally conductive composite oxide according to the present invention can be used by being added to a coating liquid such as a paint. In the case where a coating liquid is prepared by addition of the thermally conductive composite oxide according to the present invention, a preparation for coloration obtained by, for example, mixing and dispersing another coloring agent, a resin for forming a coating film or forming a molded body, an organic solvent, or the like in a vehicle can also be utilized together with the composite oxide. It is preferable that the ratio of the composite oxide according to the present invention contained in such a coating liquid is 5 to 80 parts by mass, more preferably 10 to 70 parts by mass per 100 parts by mass of the total amount of the coating liquid. The coating film or molded body coated with the coating liquid prepared in such a manner as described above is excellent in water resistance, acid resistance, and electric insulation and, further, is also excellent in thermal conductivity while maintaining strength.

The kind of resin that can be contained in the coating liquid is not particularly limited and can be selected according to the intended purpose. Specific examples of the resin include: thermoplastic resins such as polyolefin-, polyester-, polystyrene-, acrylic-, fluorine-, polyamide-, cellulose-, polycarbonate-, and polylactic acid-based thermoplastic resins; and thermosetting resins such as polyurethane- and phenol-based thermosetting resins.

The kind of organic solvent that can be contained in the coating liquid is not particularly limited, and conventionally known organic solvents can be used. Specific examples of the organic solvent include methanol, ethanol, butanol, acetone, methyl ethyl ketone, methyl isobutyl ketone, toluene, xylene, butyl acetate, and cyclohexane.

"Another component" can appropriately be selected and contained in the coating liquid according to the intended purpose within a range not deviating from the object of the present invention. Specific examples of the "another component" include an antioxidant, an ultraviolet ray absorbing agent, a light stabilizer, a disperser, an antistatic agent, a lubricant, and a sterilizer.

As a method of coating with the coating liquid, conventionally known methods can be adopted. Specific examples of the coating method include spray coating, brush coating, electrostatic coating, curtain coating, a method with a roll coater, and a method by dipping. Moreover, also as a drying method for converting the coating liquid into a coating film after coating, conventionally known methods can be adopted. Specifically, the method such as natural drying or baking may appropriately be selected and adopted according to the characteristics or the like of the coating liquid.

By using the coating liquid containing the thermally conductive composite oxide according to the present invention added therein, coating films and molded bodies obtained by coating various kinds of base materials with the coating liquid and being excellent in functionalities can be prepared. Examples of the base material include metals, glass, natural resins, synthetic resins, ceramics, woods, paper, fibers, nonwoven clothes, woven clothes, and skins, and these base materials can appropriately be selected according to the intended purposes. It is to be noted herein that the coating film to which functionalities are imparted in such a manner as described above can be utilized in various industries such as manufacturing industry, agricultural industry, mining industry, and fishing industry in addition to household use. Moreover, the shape of a coated product is not limited, and a sheet-like, film-like, plate-like shape or the like can be selected according to the intended purpose.

<Resin Composition>

Furthermore, the composite oxide according to the present invention can be used by being blended or added into a resin containing a polyamide resin, a polyolefin resin, or the like as a main component, and the resin composition obtained by blending and mixing, in accordance with a publicly known method, the composite oxide according to the present invention together with another additive as necessary can be molded into a predetermined resin molded article with an extrusion molding machine. In molding the resin composition, the composite oxide can be used in the content ratio of, for example, 5 to 95% by mass in the composition for resin molding, and the composite oxide according to the present invention is excellent in water resistance, acid resistance, and electric insulation, and further is excellent in molding processability of a resin after being blended into a synthetic resin or the like while maintaining the strength. It is not preferable that the amount of the composite oxide according to the present invention used exceeds the above-described range because there is a risk that lowering of strength or lowering of molding processability occurs, and it is not preferable that the amount of the composite oxide according to the present invention used fell below the above-described range because there is a possibility that the thermal conductivity is deteriorated.

The method for adding the composite oxide according to the present invention to a resin is not particularly limited, and conventionally known methods can be used. Examples of the method include a method in which the composite oxide according to the present invention is directly blended into a resin, and then the resultant mixture is kneaded and is then subjected to a molding process, and, in addition to the method, a method in which a composition obtained by dispersing, in advance, the composite oxide according to the present invention in a resin component, a lubricant, or the like at a high concentration is used. As mentioned previously, it is preferable that the content ratio of the composite oxide according to the present invention in the composition for resin molding is 5 to 95% by mass, however an antioxidant, a protective agent for ultraviolet rays, an antistatic agent, an antibacterial agent, a stabilizer, a crosslinker, a plasticizer, a lubricant, a mold release agent, a flame retardant, or an inorganic filler such as talc, alumina, clay, or silica can be blended as another additive as necessary in the composition for resin molding. Simultaneously, a metal soup, a polyethylene wax, or the like is used as a dispersion assistant for the additive. Examples of the metal soup include lithium stearate, magnesium stearate, zinc stearate, calcium stearate, magnesium palmitate, calcium oleate, and cobalt oleate. Moreover, as the polyethylene wax, various kinds of polyethylene waxes such as general polymerization type, decomposition type, and modified form polyethylene waxes are used.

Furthermore, the coating liquid or the resin composition utilizing the composite oxide according to the present invention generally has a white color or a light color and therefore can be changed into variously colored coating liquids or resin compositions by adding colorants to the coating liquid or the resin composition. As the colorant for use in the coloration of the coating liquid or the resin composition, various kinds of organic or inorganic pigments can be used. Examples of the colorant other than the composite oxide according to the present invention include: organic pigments such as phthalocyanine pigments, particularly brominated phthalocyanine blue pigments and phthalocyanine green pigments, azo pigments, particularly polycondensed azo-based pigments, azomethine azo-based pigments, azomethine-based pigments, isoindolinone-based pigments, quinacridone-based pigments, anthraquinone-based pigments, dioxazine-based pigments, and perinone/perylene-based pigments; and inorganic pigments such as composite oxide-based pigments other than black colored composite oxide-based pigments, titanium oxide-based pigments including titanium oxide-based white pigments, titanium oxide-based yellow pigments, and titanium oxide-based black pigments, carbon blacks, ultramarine blue pigments, and bengala.

Furthermore, the colored coating liquids or resin compositions can be obtained by a method in which a master batch compound containing various kinds of pigments, additives, and so on is prepared and then melt-kneaded with an extruder. The method in which the composite oxide according to the present invention and a dispersion assistant are blended into a resin for a compound, another additive described above is further added thereto as necessary, and the resultant mixture is mixed with a mixer such as a Henschel mixer, the resultant mixture is further kneaded with a kneader or a heating twin roller mill, and the kneaded product is pulverized after cooling to make a coarse powder or the resultant mixture is fed into an extruder and is subjected to extrusion molding to be molded into a bead shape or a pillar shape is used. The method used in molding is not particularly limited, and examples of the method include injection molding, extrusion molding, thermocompression molding, blow molding, inflation molding, and vacuum forming.

The thermally conductive composite oxide according to the present invention is used to prepare the coating liquid or resin composition as described above, and by use of the coating liquid or resin composition, the thermally conductive composite oxide according to the present invention can be used also in electronic devices having excellent acid resistance and moisture resistance together with heat dissipation. For example, the thermally conductive composite oxide according to the present invention can be utilized for metal circuit boards, circuit boards, metal laminates, inner layer circuit-containing metal-clad laminates, etc. and can be used in adhesive sheets or heat dissipation sheets, semiconductor-sealing agents, adhesives or spacers, grease, and so on.

EXAMPLES

Hereinafter, the present invention will be described more specifically based on Examples and Comparative Examples. In addition, "parts" and "%" below are on a mass basis unless otherwise noticed.

Example 1

A spinel powder being a composite oxide having a spinel structure of an Example according to the present invention was prepared by a wet process in the following manner. First of all, 100 parts (1.66 mol) of a boehmite powder (AlO(OH), molar mass of 60) were added to 3 L of water under stirring to prepare a suspension liquid of boehmite. Boehmite having a granular particle shape and having an average particle diameter of about 6 µm was used. Subsequently, 170 parts (0.83 mol) of magnesium chloride hexahydrate (molar mass of 203.3, abbreviated as "Mg chloride" in Tables") were dissolved in 200 parts of water to prepare an aqueous solution of magnesium chloride. Moreover, 130 parts of anhydrous sodium carbonate were dissolved in 200 parts of water to prepare an alkali solution. And the suspension liquid of boehmite prepared previously was heated to 70° C. under stirring, and then the solution of magnesium chloride and alkali solution prepared previously were dropped into the suspension liquid of boehmite while adjusting the pH to 8. When the dropping was completed, the suspension liquid was heated to 80° C. and the heated state was held for 1 hour. Thereafter, the suspension liquid was washed with water by decantation, and then filtered when the electric conductivity fell down to 500 µS/cm or less. The obtained residue was dried at 120° C., and then the dried product was fired at 1300° C. for 5 hours in the air. And the obtained fired product was pulverized to obtain a powdered spinel (hereinafter, referred to as "spinel powder") of the present Example.

The average particle diameter and the hardness were measured for the spinel powder obtained above. The details will be mentioned later. Moreover, the obtained spinel powder was kneaded into a resin and was then molded, and thereafter the physical properties of the obtained molded body were measured and evaluated. The details of the measurement method, the evaluation method, and the evaluation criteria will be mentioned later. The results are shown in Table 1 together with the composition, and so on.

Example 2

A spinel powder of the present Example was obtained in the same manner as in Example 1 except that the amount of magnesium chloride hexahydrate used in Example 1 was changed to 85 parts (0.42 mol). And the measurement of physical properties and the evaluation by respective tests were conducted in the same manner as in Example 1, and the results are shown in Table 1.

Example 3

A spinel powder of the present Example was obtained in the same manner as in Example 1 except that the amount of magnesium chloride hexahydrate used in Example 1 was changed to 203 parts (1.00 mol). And the measurement of physical properties and the evaluation by respective tests were conducted in the same manner as in Example 1, and the results are shown in Table 1.

Example 4

A spinel powder of the present Example was obtained in the same manner as in Example 1 except that 240 parts (0.83 mol) of zinc sulfate heptahydrate (molar mass of 287.7, abbreviated as "Zn sulfate" in Table 1) were used in place of magnesium chloride hexahydrate used in Example 1. And the measurement of physical properties and the evaluation by respective tests were conducted in the same manner as in Example 1, and the results are shown in Table 1.

Example 5

A spinel powder of the present Example was obtained in the same manner as in Example 1 except that 85 parts (0.42 mol) of magnesium chloride hexahydrate used in Example 1 and 120 parts (0.42 mol) of zinc sulfate heptahydrate (molar mass of 287.7) were each used as the salt of the metal other than aluminum. And the measurement of physical properties and the evaluation by respective tests were conducted in the same manner as in Example 1, and the results are shown in Table 1.

[Evaluation]

The particle diameter, the Mohs hardness, and the electric insulation were measured for each spinel powder of Examples by the following methods, and the acid resistance and the water resistance were evaluated for each spinel powder of Examples by the following methods. Moreover, as will be mentioned later, each spinel powder was kneaded into a resin and was then molded, thereafter the acid resistance, the water resistance, and the electric insulation were measured for the obtained molded bodies to evaluate spinel powders. The obtained evaluation results are shown in Table 1 together with the raw materials and compositions of respective spinel powders.

(Measurement of Number Average Particle Diameter)

The average particle diameter of each spinel powder (composite oxide) is a number average particle diameter obtained by averaging numerical values at 50 points randomly selected from an image extracted from a transmission electron microscope photograph. Moreover, an average minor axis diameter and an average major axis diameter were each obtained by averaging numerical values at 50 points also for composite oxides having anisotropy, such as a composite oxide having a flake-like shape or a needle-like shape, in the same manner as describe above, and it is to be noted herein that the composite oxide having anisotropy is defined as a composite oxide having a numerical value of the average minor axis diameter/the average major axis diameter of ½ or less.

(Measurement of Hardness)

The hardness of the spinel powder was measured by comparative measurement in accordance with a Mohs hardness scale from 1 to 10. Specifically, a substance to be measured was slid between two mineral substances each having a known Mohs hardness and having a smooth surface, and the Mohs harness was checked by the surface state of the substance to be measured. The thermally conductive composite oxide according to the present invention needs to have a Mohs hardness of less than 9. The reason is that aluminum oxide having a Mohs hardness of 9 causes a problem or the like, such as wear in production apparatuses, due to hardness that is too high as mentioned previously. More preferable Mohs hardness, which is desired in the present invention, for the thermally conductive composite oxide according to the present invention is 6 to 8, still more preferably about 7 to about 8.

(Preparation of Samples for Evaluation)

Two kinds of resin molded bodies for evaluation each having a different content of the composite oxide as an object of evaluation were prepared using each spinel powder (composite oxide) in the following manner. The resin molded bodies for evaluation were prepared using each of a resin composition containing 50 parts by mass of the composite oxide to 50 parts by mass of a polypropylene [manufactured by Prime Polymer Co., Ltd.; MFR (Melt flow rate) of 20 g/10 min] and a resin composition containing 70 parts by mass of the composite oxide to 30 parts by mass of the polypropylene in such a manner that the resin composition was melt-kneaded with Plastomill at a preset temperature of 200° C. and then subjected to metallic mold pressing at 175° C.

(Measurement of Acid Resistance-1)

The resin molded body for evaluation prepared above and containing the resin composition containing 50 parts by mass of the composite oxide was cut out into a size of 20 mm×20 mm×60 mm, and the obtained molded body was dipped into a hydrochloric acid solution, which had a pH of 2.0 and was heated to 50° C., for 3 hours. The withstand voltage was measured before and after dipping, and the acid resistance was determined using measured value according to the following criteria.

<Criteria for Determining Acid Resistance-1>

A: Lowering of withstand voltage from initial value before dipping to value after dipping is less than 5%

B: Lowering of withstand voltage from initial value before dipping to value after dipping is 5% or more and less than 10%

C: Lowering of withstand voltage from initial value before dipping to value after dipping is 10% or more and less than 50%

D: Lowering of withstand voltage from initial value before dipping to value after dipping is 50% or more (Measurement of Acid Resistance-2)

Each of spinel powders of Example 1 and Example 4 was used as a sample for measurement, and 2 parts of the spinel powder were dipped into $\frac{1}{10}$ N sulfuric acid aqueous solution and left to stand in a sealed container for 100 hours, and thereafter the pH was measured. The acid resistance was determined and evaluated using the obtained measured value according to the following criteria. In addition, in the above measurement, any of the samples had an initial pH of 1.2. Moreover, the test of the acid resistance-2 was conducted only for the spinel powders of Examples 1 and 4 with respect to the spinel powders of Examples.

<Criteria for Determining Acid Resistance-2>

A: Increase of pH from initial value before dipping to value after dipping for 100 hours is less than 0.5

B: Increase of pH from initial value before dipping to value after dipping for 100 hours is 0.5 or more and less than 1.0

C: Increase of pH from initial value before dipping to value after dipping for 100 hours is 1.0 or more and less than 3.0

D: Increase of pH from initial value before dipping to value after dipping for 100 hours is 3.0 or more (Measurement of Water Resistance)

Each spinel powder (composite oxide) was used in an amount of 5 parts, dipped into 100 parts of pure water, and the resultant mixture was placed in a container, boiled at 100° C. for 5 minutes, and filtrated, and the filtrate was used as a sample for measurement. The electric conductivity was measured using the sample for measurement prepared in the manner as described above with an electric conductivity meter, and was determined and evaluated according to the following criteria.

<Criteria for Determining Water Resistance>

A: Increase of electric conductivity from initial value before dipping to value after dipping is less than 100 μS/cm B: Lowering of electric conductivity from initial value before dipping to value after dipping is 100 μS/cm or more and less than 300 μS/cm C: Lowering of electric conductivity from initial value before dipping to value after dipping is 300 μS/cm or more and less than 1000 μS/cm D: Lowering of electric conductivity from initial value before dipping to value after dipping of 1000 μS/cm or more (Measurement of Electric Insulation)

Each spinel powder (composite oxide) was filled in an aluminum ring, and then subjected to press molding at 20 MPa with a hydraulic press to prepare a sample for measurement. A volume electricity resistance value was measured using the sample for measurement with an electric resistivity meter, and the electric insulation was determined and evaluated according to the following criteria using the measured values obtained.

A: $10^{10}$ Ω·cm or more

B: $10^5$ Ω·cm or more to less than $10^{10}$ Ωcm

C: 10 Ω·cm or more to less than $10^5$ Ω·cm

D: less than 10 Ω·cm (Measurement of Thermal Conductivity)

Test pieces were prepared using each of the two resin compositions in which the content of the composite oxide as an object of evaluation was 50% and 70% with a metal mold having a length of 20 mm×a width of 20 mm×a height of 60 mm in the same manner as in the preparation of the resin molded bodies for evaluation previously prepared. The thermal conductivity of each test piece was measured with TPS-2500S manufactured by Kyoto Electronics Manufacturing Co., Ltd., and the measured values are shown in Table 1. The value shown in the upper column in Table 1 is for the test piece prepared using the resin composition in which the content of the composite oxide is 50% (shown as "content of 50%" in Table 1), and the value shown in the lower column in Table 1 is for the test piece prepared using the resin composition in which the content of the composite oxide is 70% (shown as "content of 70%" in Table 1).

TABLE 1

Compositions, physical properties, and evaluation results for spinel powders of Examples

|  |  |  | Example 1 | Example 2 | Example 3 | Example 4 | Example 5 |  |
|---|---|---|---|---|---|---|---|---|
| Composition | Alumina-based compound (a) | Kind | Boehmite | Boehmite | Boehmite | Boehmite | Boehmite |  |
|  |  | Parts | 100 | 100 | 100 | 100 | 100 |  |
|  |  | Number of moles | 1.66 | 1.66 | 1.66 | 1.66 | 1.66 |  |
|  | Another metal salt (b) | Kind | Mg chloride | Mg chloride | Mg chloride | Zn sulfate | Mg chloride | Zn sulfate |
|  |  | Parts | 170 | 85 | 203 | 240 | 85 | 120 |
|  |  | Number of moles | 0.83 | 0.42 | 1.00 | 0.83 | 0.42 | 0.42 |
|  | Molar ratio = (b)/(a) |  | 0.5 | 0.25 | 0.6 | 0.5 | 0.51 |  |
|  | Production process |  | Wet | Wet | Wet | Wet | Wet |  |
|  | Average particle diameter (μm) |  | 6.2 | 6.2 | 6.2 | 6.2 | 6.2 |  |
|  | Mohs hardness |  | 7 | 8 | 7 | 6.5 | 7 |  |
|  | Acid resistance-1 (molded body) |  | A | A | B | A | A |  |
|  | Acid resistance-2 (powder) |  | A | — | — | A | — |  |
|  | Water resistance |  | A | A | B | A | A |  |
|  | Electric insulation |  | A | B | A | A | A |  |
| Thermal conductivity (W/m · K) | Content of 50% |  | 0.53 | 0.53 | 0.54 | 0.51 | 0.52 |  |
|  | Content of 70% |  | 0.90 | 0.90 | 0.93 | 0.75 | 0.85 |  |

Example 6

A spinel powder of the present Example using magnesium chloride hexahydrate as a raw material was obtained in the same manner as in Example 1 except that 85 parts (0.83 mol) of an α-alumina powder ($Al_2O_3$, corundum type (trigonal system), Mohs hardness of 9, molar mass of 102) were used in place of the boehmite powder used in Example 1. And the measurement of physical properties and the evaluation by respective tests were conducted in the same manner as in Example 2, and the results are shown in Table 2.

Example 7

A spinel powder of the present Example using magnesium chloride hexahydrate as a raw material was obtained in the same manner as in Example 1 except that 85 parts (0.83 mol) of a γ-alumina powder ($Al_2O_3$, spinel type (cubic system), molar mass of 102) were used in place of the boehmite powder used in Example 1. And the measurement of physical properties and the evaluation by respective tests were conducted in the same manner as in Example 2, and the results are shown in Table 2.

Example 8

A spinel powder of the present Example using magnesium chloride hexahydrate as a raw material was obtained in the same manner as in Example 1 except that 85 parts (0.83 mol as alumina, or 1.66 mol as aluminum) of a θ-alumina powder ($Al_2O_3$, molar mass of 102) were used in place of the boehmite powder used in Example 1. And the measurement of physical properties and the evaluation by respective tests were conducted in the same manner as in Example 2, and the results are shown in Table 2. In addition, the number of moles (a) of the alumina-based compound in Table 2 is shown as the number of moles of aluminum in order to make clear the composition ratio in each sample.

Example 9

A spinel powder of the present Example was obtained in the same manner as in Example 6 except that 107 parts (0.83 mol) of calcium chloride monohydrate (molar mass of 129, abbreviated as "Ca chloride" in Table 2) were used in place of magnesium chloride hexahydrate used in Example 6. And the measurement of physical properties and the evaluation by respective tests were conducted in the same manner as in Example 2, and the results are shown in Table 2.

Example 10

A spinel powder of the present Example was obtained in the same manner as in Example 6 except that 222 parts (0.83 mol) of strontium chloride hexahydrate (molar mass of 267, abbreviated as "St chloride" in Table 2) were used in place of magnesium chloride hexahydrate used in Example 6. And the measurement of physical properties and the evaluation by respective tests were conducted in the same manner as in Example 2, and the results are shown in Table 2.

and the evaluation by respective tests were conducted in the same manner as in Example 2 for the obtained spinel powder, and the results are shown in Table 3. In addition, the boehmite powder that was the same one as used in Example 1 was used.

Example 12

A spinel powder was prepared by the wet mixing process as described below. Specifically, first of all, 120 parts (2.0 mol) of a boehmite powder were added to 3 L of water under stirring to prepare a suspension liquid. Subsequently, 84 parts (1.0 mol) of magnesium carbonate were added to the suspension liquid under stirring. Thereafter, the suspension liquid was washed with water by decantation, and then filtered when the electric conductivity fell down to 500 μS/cm or less. The obtained residue was dried at 120° C., and then the dried product was fired at 1300° C. for 5 hours in the air. And the fired product obtained was pulverized to obtain a spinel powder of the present Example. The measurement of physical properties and the evaluation by respective tests were conducted in the same manner as in Example 2 for the obtained spinel powder, and the results are shown in Table 3. In addition, the boehmite powder that was the same one as used in Example 1 was used.

Example 13

A spinel powder was prepared by the dry process in the same manner as in Example 11. Specifically, the spinel powder of the present Example was obtained in the same manner as in Example 11 except that 110 parts (0.2 mol, or 1.0 mol as zinc) of a basic zinc carbonate powder ($2ZnCO_3 \cdot 3Zn(OH)_2 \cdot H_2O$, molar mass of 549, abbreviated as "Zn carbonate" in Table 3) were used in place of magnesium carbonate used in Example 11. The measurement of

TABLE 2

Compositions, physical properties, and evaluation results for spinel powders of Examples

| | | | Example 6 | Example 7 | Example 8 | Example 9 | Example 10 |
|---|---|---|---|---|---|---|---|
| Composition | Alumina-based compound (a) | Kind | α-alumina | γ-alumina | θ-alumina | α-alumina | α-alumina |
| | | Parts | 85 | 85 | 85 | 85 | 85 |
| | | Number of moles* | 1.66 | 1.66 | 1.66 | 1.66 | 1.66 |
| | Another metal salt (b) | Kind | Mg chloride | Mg chloride | Mg chloride | Ca chloride | St chloride |
| | | Parts | 170 | 170 | 170 | 107 | 222 |
| | | Number of moles | 0.83 | 0.83 | 0.83 | 0.83 | 0.83 |
| | Molar ratio = (b)/(a) | | 0.5 | 0.5 | 0.5 | 0.5 | 0.5 |
| | Production process | | Wet | Wet | Wet | Wet | Wet |
| | Average particle diameter (μm) | | 17 | 20 | 24 | 17 | 17 |
| | Mohs hardness | | 8 | 8 | 8 | 8 | 8 |
| | Acid resistance-1 (molded body) | | B | B | B | B | B |
| | Water resistance | | B | B | B | B | B |
| | Electric insulation | | B | B | B | B | B |
| Thermal conductivity (W/m · K) | | Content of 50% | 0.63 | 0.63 | 0.62 | 0.54 | 0.54 |
| | | Content of 70% | 1.17 | 1.17 | 1.16 | 1.10 | 1.05 |

*The number of moles is described as the number of moles of an aluminum element

Example 11

A spinel powder was prepared by the dry process as described below. Specifically, 120 parts (2.0 mol) of a boehmite powder and 84 parts (1.0 mol) of a magnesium carbonate powder (molar mass of 84, abbreviated as "Mg carbonate" in Table 3) were weighed and fed into a small-size mixer. And after mixing for 3 minutes, the resultant mixture was fired at 1300° C. for 5 hours in the air, and the fired product was pulverized to obtain a spinel powder of the present Example. The measurement of physical properties physical properties and the evaluation by respective tests were conducted in the same manner as in Example 2 for the obtained spinel powder, and the results are shown in Table 3. The number of moles herein is described as the number of moles of zinc in order to make clear the composition. In addition, the boehmite powder that was the same one as used in Example 1 was used.

Example 14

A spinel powder was obtained by the dry process in the same manner as in Example 11 except that 102 parts (1 mol, or 2 mol as aluminum) of an α-alumina powder were used in place of the boehmite powder used in Example 11. The measurement of physical properties and the evaluation by respective tests were conducted in the same manner as in Example 2 for the obtained spinel powder, and the results are shown in Table 3. In addition, the number of moles is described as the number of moles of aluminum in order to make clear the composition.

Example 15

A spinel powder was obtained by the dry process in the same manner as in Example 11 except that 102 parts (1 mol, or 2 mol as aluminum) of a γ-alumina powder were used in place of the boehmite powder used in Example 11. The measurement of physical properties and the evaluation by respective tests were conducted in the same manner as in Example 2 for the obtained spinel powder, and the results are shown in Table 3. In addition, the number of moles is described as the number of moles of aluminum in order to make clear the composition.

Example 16

A spinel powder was obtained by the dry process in the same manner as in Example 11 except that 102 parts (1 mol, or 2 mol as aluminum) of a θ-alumina powder were used in place of the boehmite powder used in Example 11. The measurement of physical properties and the evaluation by respective tests were conducted in the same manner as in Example 2 for the obtained spinel powder, and the results are shown in Table 3. In addition, the number of moles is described as the number of moles of aluminum in order to make clear the composition.

Example 17

A flake-like spinel powder of the present Example was obtained in the same manner as in Example 1 except that 85 parts of a flake-like alumina having an aspect ratio of 20 and an average particle diameter of 10 μm were used in place of the boehmite powder used in Example 1. And the measurement of physical properties and the evaluation by respective tests were conducted in the same manner as in Example 2, and the results are shown in Table 4.

Example 18

A flake-like spinel powder of the present Example was obtained in the same manner as in Example 1 except that 85 parts of a flake-like boehmite having an aspect ratio of 20 and an average particle diameter of 8 μm were used in place of the boehmite powder used in Example 1. And the measurement of physical properties and the evaluation by respective tests were conducted in the same manner as in Example 2, and the results are shown in Table 4.

Example 19

A needle-like spinel powder of the present Example was obtained in the same manner as in Example 1 except that 85 parts of a needle-like boehmite having an aspect ratio of 60 and an average particle diameter of 7 μm were used in place of the boehmite powder used in Example 1. And the measurement of physical properties and the evaluation by respective tests were conducted in the same manner as in Example 2, and the results are shown in Table 4.

TABLE 3

Compositions, physical properties, and evaluation results for spinel powders of Examples

| | | | Example 11 | Example 12 | Example 13 | Example 14 | Example 15 | Example 16 |
|---|---|---|---|---|---|---|---|---|
| Composition | Alumina-based compound (a) | Kind | Boehmite | Boehmite | Boehmite | α-alumina | γ-alumina | θ-alumina |
| | | Parts | 120 | 120 | 120 | 102 | 102 | 102 |
| | | Number of moles* | 2 | 2 | 2 | 2 | 2 | 2 |
| | Another metal salt (b) | Kind | Mg carbonate | Mg carbonate | Zn carbonate | Mg carbonate | Mg carbonate | Mg carbonate |
| | | Parts | 84 | 84 | 110 | 84 | 84 | 84 |
| | | Number of moles | 1 | 1 | 1 | 1 | 1 | 1 |
| | Molar ratio = (b)/(a) | | 0.5 | 0.5 | 0.5 | 0.5 | 0.5 | 0.5 |
| | Production process | | Dry | Wet mixing | Dry | Dry | Dry | Dry |
| | Average particle diameter (μm) | | 6.2 | 6.2 | 6.2 | 17 | 20 | 24 |
| | Mohs hardness | | 8 | 8 | 7 | 8 | 8 | 8 |
| | Acid resistance-1 (molded body) | | B | B | B | B | B | B |
| | Water resistance | | B | B | B | B | B | B |
| | Electric insulation | | B | B | B | B | B | B |
| Thermal conductivity (W/m · K) | Content of 50% | | 0.51 | 0.53 | 0.58 | 0.62 | 0.59 | 0.58 |
| | Content of 70% | | 0.87 | 0.94 | 1.13 | 1.16 | 1.13 | 1.13 |

*The number of moles is described as the number of moles of an aluminum element

TABLE 4

Compositions, physical properties, and evaluation results for spinel powders of Examples using flake-like or needle-like alumina-based compound as raw material

| | | | Example 17 | Example 18 | Example 19 |
|---|---|---|---|---|---|
| Composition | Alumina-based compound (a) | Kind | Flake-like alumina Aspect ratio: 20 Average particle diameter: 10 μm | Flake-like boehmite Aspect ratio: 20 Average particle diameter: 8 μm | Needle-like boehmite Aspect ratio: 60 Average particle diameter: 7 μm |
| | | Parts | 85 | 85 | 85 |
| | | Number of moles | 0.83 | 0.83 | 0.83 |
| | Another metal salt (b) | Kind | Mg chloride | Mg chloride | Mg chloride |
| | | Parts | 170 | 170 | 170 |
| | | Number of moles | 0.83 | 0.83 | 0.83 |
| | Molar ratio = (b)/(a) | | 1.0 | 1.0 | 1.0 |
| | Production process | | Wet | Wet | Wet |
| | Average particle diameter (μm) | | Major axis: 8 μm Minor axis: 3 μm | Major axis: 7 μm Minor axis: 3 μm | Major axis: 7 μm Minor axis: 0.1 μm |
| | Shape of powder | | Flake-like | Flake-like | Needle-like |
| | Mohs hardness | | 8 | 7 | 7 |
| | Acid resistance-1 (molded body) | | B | B | B |
| | Water resistance | | B | B | B |
| | Electric insulation | | B | B | B |
| | Thermal conductivity (W/m · K) | Content of 50% | 0.72 | 0.58 | 0.7 |
| | | Content of 70% | 1.25 | 0.97 | 1.27 |

*: The number of moles is described as the number of moles of an aluminum element

Example 20

The surface of the spinel powder was modified using the previously obtained spinel powder of an Example according to the present invention, being a composite oxide having a spinel structure, in the following manner. First of all, 140 parts of the spinel powder of Example 1 were added to 800 parts of water under stirring to prepare a suspension liquid. Subsequently, an aqueous solution obtained by dissolving 7 parts of sodium stearate in 320 parts of water the temperature of which was 90° C. was dropped to the suspension liquid under stirring. Thereafter, dilute sulfuric acid was dropped thereto until the pH became 9 to neutralize the suspension liquid. The obtained suspension liquid was washed with water by decantation, and then filtered when the electric conductivity fell down to 300 μS/cm or less. The obtained residue was dried at 120° C., and then the dried product was fired at 1300° C. for 5 hours in the air. And the fired product obtained was pulverized to obtain a spinel powder of the present Example the surface of which was treated with stearic acid was obtained. The measurement of physical properties and the evaluation by respective tests were conducted in the same manner as in Example 1 for the obtained spinel powder, and the results are shown in Table 5.

Example 21

A spinel powder the surface of which was treated with oleic acid was obtained in the same manner as in Example 20 except that oleic acid was used in place of sodium stearate used in Example 20. The measurement of physical properties and the evaluation by respective tests were conducted in the same manner as in Example 1 for the obtained spinel powder, and the results are shown in Table 5.

TABLE 5

Compositions, physical properties, and evaluation results for surface-modified spinel powders of Examples

| | | | Example 20 | Example 21 |
|---|---|---|---|---|
| Composition | Spinel powder | Kind | Spinel powder of Example 1 | Spinet powder of Example 1 |
| | | Parts | 140 | 140 |
| | | Amount used | 1 | 1 |
| | Surface modifier | Kind | Sodium stearate | Oleic acid |
| | | Parts | 7 | 7 |
| | | Amount used | 0.05 | 0.05 |
| Average particle diameter (μm) | | | 6.2 | 6.2 |
| Mohs hardness | | | 7 | 7 |
| Acid resistance-1 (molded body) | | | B | B |
| Water resistance | | | B | B |
| Electric insulation | | | A | A |
| Thermal conductivity (W/m · K) | | Content of 50% | 0.62 | 0.69 |
| | | Content of 70% | 1.01 | 1.21 |

Example 22

A thermally conductive composition of the present Example was obtained by adding a thermally conductive filler to the previously obtained spinel powder of an Example of the present invention, being a composite oxide having a spinel structure. Specifically, 7 parts of boron nitride as a thermally conductive filler were added to 140 parts of the spinel powder of Example 1, and the resultant mixture was then mixed and pulverized with a mixer until the mixture became uniform to obtain a composition. The measurement of physical properties and the evaluation by respective tests were conducted in the same manner as in Example 2 for the obtained thermally conductive composition containing the spinel powder and the thermally conductive filler, and the results are shown in Table 6.

Example 23

To 140 parts of the spinel powder of Example 14, 2 parts of α-alumina as a thermally conductive filler were added, and the resultant mixture was then mixed and pulverized until the mixture became uniform to obtain a composition. The measurement of physical properties and the evaluation by respective tests were conducted in the same manner as in Example 2 for the obtained thermally conductive composition containing the spinel powder and the thermally conductive filler, and the results are shown in Table 6.

TABLE 6

Compositions, physical properties, and evaluation results for thermally conductive composite oxide-containing compositions of Examples

|  |  |  | Example 22 | Example 23 |
|---|---|---|---|---|
| Composition | Spinel powder | Kind | Spinel powder of Example 1 | Spinel powder of Example 14 |
|  |  | Parts | 140 | 140 |
|  |  | Amount used | 1 | 1 |
|  | Thermally conductive filler added | Kind | Boron nitride | α-alumina |
|  |  | Parts | 7 | 2 |
|  |  | Amount used | 0.05 | 0.02 |
| Average particle diameter (μm) |  |  | 7 | 15 |
| Mohs hardness |  |  | 7 | 8 |
| Acid resistance-1 (molded body) |  |  | B | B |
| Water resistance |  |  | B | B |
| Electric insulation |  |  | A | A |
| Thermal conductivity (W/m · K) | Content of 50% |  | 0.54 | 0.6 |
|  | Content of 70% |  | 0.95 | 0.98 |

Comparative Example 1

The boehmite powder that was the same one as used as a raw material in Example 1 was fired at a high temperature of 1300° C. or higher to obtain an alumina powder. And respective tests were conducted to measure and evaluate the physical properties in the same manner as in Example 1, and the evaluation results are shown in Table 7.

Comparative Example 2

Into 1800 parts of water, 1260 parts of an aqueous solution containing 8% of aluminum sulfate and an alkali solution obtained by dissolving 640 parts of anhydrous sodium carbonate in 2000 parts of water were simultaneously dropped so that the pH of the resultant mixture might be 4. Thereafter, into the resultant mixture, an aqueous solution obtained by dissolving 200 parts of magnesium chloride hexahydrate in 1000 parts of water and the rest of the alkali solution were simultaneously dropped so that the pH of the resultant mixture might be 8.5 to obtain a suspension liquid containing an aluminum-based compound. And the obtained suspension liquid was processed in the same manner as in Example 1 to obtain a spinel powder of the present Comparative Example. And respective tests were conducted to measure and evaluate the physical properties in the same manner as in Example 1, and the evaluation results are shown in Table 7. A resin molded body for evaluation was prepared using the spinel powder of the present Comparative Example, however the spinel powder of the present Comparative Example was inferior in a handling property because the particles thereof were too fine and 70 parts by mass of the spinel powder were not able to be contained in polypropylene.

Comparative Example 3

Respective tests were conducted for α-alumina that was the same one as used as a raw material in Example 6 to measure and evaluate the physical properties in the same manner as in Example 1, and the evaluation results are shown in Table 7.

Comparative Example 4

Respective tests were conducted for a boron nitride (abbreviated as "B nitride" in Table 7) powder that was the same one as used as a raw material in Example 22 to measure and evaluate the physical properties in the same manner as in Example 1, and the evaluation results are shown in Table 7.

Comparative Example 5

Respective tests were conducted for a zinc oxide (abbreviated as "Zn oxide" in Table 7) powder to measure and evaluate the physical properties in the same manner as in Example 1, and the evaluation results are shown in Table 7.

Comparative Example 6

Respective tests were conducted for a magnesium oxide (abbreviated as "Mg oxide" in Table 7) powder to measure and evaluate the physical properties in the same manner as in Example 1, and the evaluation results are shown in Table 7.

Comparative Example 7

Respective tests were conducted for an aluminum nitride (abbreviated as "Al nitride" in Table 7) powder to measure and evaluate the physical properties in the same manner as in Example 1, and the evaluation results are shown in Table 7.

TABLE 7

Compositions, physical properties, and evaluation results for powders, etc. of Comparative Examples

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Kind of powder, etc. | Boehmite | *1 | α-alumina | B nitride | Zn oxide | Mg Oxide | Al nitride |
| Average particle diameter (μm) | 6.2 | 0.5 | 12 | 18 | 20 | 20 | 20 |
| Mohs hardness | 4 | 7 | 9 | 2 | 5 | 6 | 9 |
| Acid resistance-1 (molded body) | B | A | B | C | D | D | D |
| Acid resistance-2 (powder) | B | — | A | C | D | D | D |
| Water resistance | B | A | B | B | D | D | D |
| Electric insulation | C | A | A | A | C | A | A |

TABLE 7-continued

Compositions, physical properties, and evaluation results for powders, etc. of Comparative Examples

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Thermal conductivity (W/m · K) | Content of 50% | 0.52 | 0.41 | 0.50 | 1.31 | 0.47 | 0.56 | 1.52 |
| | Content of 70% | 0.86 | *2 | 0.97 | 1.90 | 0.95 | 1.18 | 2.20 |

*1: Spinel powder produced using suspension liquid containing Mg chloride and 8% of Al sulfate
*2: 70% of spinel powder was not able to be contained Comparative Example 8

A spinel powder of the present Comparative Example was obtained in the same manner as in Example 1 except that the amount of magnesium chloride hexahydrate used as a raw material in Example 1 was changed to 30 parts (0.15 mol). And respective tests were conducted to measure and evaluate the physical properties in the same manner as in Example 2, and the results are shown in Table 8.

Comparative Example 9

A spinel powder of the present Comparative Example was obtained in the same manner as in Example 1 except that the amount of magnesium chloride hexahydrate used as a raw material in Example 1 was changed to 350 parts (1.72 mol). And respective tests were conducted to measure and evaluate the physical properties in the same manner as in Example 2, and the results are shown in Table 8.

TABLE 8

Compositions, physical properties, and evaluation results for spinel powders of Comparative Examples

| | | | Comparative Example 8 | Comparative Example 9 |
|---|---|---|---|---|
| Composition | Alumina-based compound | Kind | Boehmite | Boehmite |
| | | Parts | 100 | 100 |
| | | Number of moles (a) | 1.66 | 1.66 |
| | Another metal salt (b) | Kind | Mg chloride | Mg chloride |
| | | Parts | 30 | 350 |
| | | Number of moles | 0.15 | 1.72 |
| | | Molar ratio = (b)/(a) | 0.09 | 1.04 |
| Production process | | | Wet | Wet |
| Average particle diameter (μm) | | | 6.2 | 6.2 |
| Mohs hardness | | | 9 | 6 |
| Acid resistance-1 (molded body) | | | B | C |
| Water resistance | | | B | B |
| Electric insulation | | | B | B |
| Thermal conductivity (W/m · K) | Content of 50% | | 0.52 | 0.49 |
| | Content of 70% | | 0.86 | 0.75 |

As indicated in the above-described Examples and Comparative Examples, the thermally conductive composite oxides of the Examples according to the present invention realize a moderate Mohs hardness and become applicable to various high-functional intended purposes such as those having favorable acid resistance and water resistance and being excellent in electric insulation and thermal conductivity. Furthermore, a thermally conductive composite oxide that has a flake-like or needle-like shape and that is suitable as a filler can be obtained at a high purity by a simple and easy process in which an alumina-based compound having a flake-like or needle-like shape is used as a raw material and is fired, and therefore utilization of the thermally conductive composite oxide is expected.

The invention claimed is:

1. A thermally conductive composite oxide comprising:
aluminum as a main metal component; and
at least one metal other than aluminum,
wherein the thermally conductive composite oxide is a fired product of a precursor comprising: at least (i) an alumina-based compound comprising the aluminum; and (ii) a compound comprising the at least one metal other than aluminum,
the at least one metal other than aluminum is at least one metal selected from the group consisting of magnesium, zinc, calcium, and strontium,
a ratio (b mol)/(a mol) of a number of moles (b) of the at least one metal other than aluminum relative to a number of moles (a) of the aluminum as an aluminum element in the alumina-based compound is in a range of 0.1 or more and 1.0 or less,
the thermally conductive composite oxide is a composite oxide having a flake shape or a needle shape and having a spinel structure,
the thermally conductive composite oxide has an average major axis diameter in a range from 5 to 40 μm and an average minor axis diameter in a range from 0.1 to 30 μm, and
a Mohs hardness of the thermally conductive composite oxide is less than 9.

2. The thermally conductive composite oxide according to claim 1,
wherein a content ratio of each metal relative to a total amount of the aluminum and the at least one metal other than aluminum in the thermally conductive composite oxide is in a range from 50 to 90 mol % for the aluminum derived from the alumina-based compound and is in a range from 10 to 50 mol % for the at least one metal other than aluminum.

3. The thermally conductive composite oxide according to claim 1,
wherein the alumina-based compound is alumina, aluminum hydroxide, or an alumina hydrate.

4. The thermally conductive composite oxide according to claim 1,
wherein the compound of the at least one metal other than aluminum is at least one compound selected from the group consisting of an oxide, a hydroxide, a sulfate, a nitrate, a chloride, a carbonate, a basic carbonate, an oxalate, and an acetate of the at least one metal other than aluminum.

5. A process for producing the thermally conductive composite oxide according to claim 1, the process comprising:
adding an alkali agent and an aqueous solution of the compound of the at least one metal other than aluminum to an aqueous suspension solution of the alumina-based compound so as to deposit a precipitate on a surface of the alumina-based compound, thereby producing a precursor;

firing the produced precursor; and thereafter pulverizing the fired product, wherein the alumina-based compound has a flake shape or a needle shape.

6. A thermally conductive composite oxide-containing composition, comprising:

the thermally conductive composite oxide according to claim 1; and a thermally conductive filler.

7. An article comprising a coating liquid composition or a resin composition, wherein the coating liquid composition and the resin composition comprise the thermally conductive composite oxide according to claim 1, and optionally further comprise a thermally conductive filler.

8. A process for producing a thermally conductive composite oxide, the process comprising:

adding an alkali agent and an aqueous solution of a compound of a metal other than aluminum to an aqueous suspension solution of an alumina-based compound so as to deposit a precipitate on a surface of the alumina-based compound, thereby producing a precursor;

firing the produced precursor at a temperature in a range from 1000° C. to 1500° C.; and thereafter pulverizing the fired product, wherein the thermally conductive composite oxide comprises:

aluminum as a main metal component; and the metal other than aluminum, wherein the metal other than aluminum is at least one metal selected from the group consisting of magnesium, zinc, calcium, and strontium, and a ratio (b mol)/(a mol) of a number of moles (b) of the at least one metal other than aluminum relative to a number of moles (a) of the aluminum as an aluminum element in the alumina-based compound is in a range of 0.1 or more and 1.0 or less.

9. The process for producing a thermally conductive composite oxide according to claim 8, wherein the precipitate deposited on the surface of the alumina-based compound is at least one material selected from the group consisting of an oxide, a hydroxide, and a carbonate, of the at least one metal other than aluminum.

* * * * *